US008719626B2

(12) United States Patent
Compton et al.

(10) Patent No.: US 8,719,626 B2
(45) Date of Patent: May 6, 2014

(54) PROACTIVELY REMOVING CHANNEL PATHS IN ERROR FROM A VARIABLE SCOPE OF I/O DEVICES

(75) Inventors: Scott B. Compton, Hyde Park, NY (US); Craig D. Norberg, Wappinger Falls, NY (US); Dale F. Riedy, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 13/247,684

(22) Filed: Sep. 28, 2011

(65) Prior Publication Data

US 2013/0080821 A1 Mar. 28, 2013

(51) Int. Cl.
*G06F 11/00* (2006.01)

(52) U.S. Cl.
USPC .................. 714/11; 714/10; 714/25; 714/48

(58) Field of Classification Search
USPC .............................................. 714/4.1, 25, 11
See application file for complete search history.

(56) References Cited

U.S. PATENT DOCUMENTS

| 4,201,976 | A | | 5/1980 | Patel |
| 4,527,237 | A | | 7/1985 | Frieder et al. |
| 4,922,491 | A | * | 5/1990 | Coale ............................. 714/26 |
| 5,418,909 | A | | 5/1995 | Jackowski et al. |
| 5,423,026 | A | | 6/1995 | Cook et al. |
| 5,812,748 | A | | 9/1998 | Ohran et al. |
| 6,336,193 | B1 | | 1/2002 | Yudenfriend et al. |
| 6,338,145 | B1 | | 1/2002 | Yudenfriend et al. |
| 6,338,151 | B1 | | 1/2002 | Yudenfriend et al. |
| 7,146,542 | B2 | | 12/2006 | Srinivasan et al. |
| 7,234,086 | B1 | | 6/2007 | de Koos et al. |
| 7,350,114 | B2 | | 3/2008 | Moody, II et al. |
| 7,549,090 | B2 | | 6/2009 | Bailey et al. |
| 2004/0165895 | A1 | | 8/2004 | Taga et al. |
| 2006/0020846 | A1 | | 1/2006 | Moody et al. |
| 2006/0253740 | A1 | | 11/2006 | Ritz et al. |
| 2007/0033494 | A1 | | 2/2007 | Wenger et al. |
| 2007/0070923 | A1 | | 3/2007 | Honma et al. |
| 2008/0127311 | A1 | | 5/2008 | Yasaki et al. |
| 2008/0209254 | A1 | | 8/2008 | Bailey et al. |
| 2010/0011242 | A1 | * | 1/2010 | Baba et al. ....................... 714/11 |
| 2010/0011434 | A1 | * | 1/2010 | Kay ................................. 726/14 |
| 2010/0124416 | A1 | * | 5/2010 | Kawaguchi et al. ............. 398/2 |
| 2010/0295732 | A1 | | 11/2010 | Lee et al. |
| 2011/0060944 | A1 | * | 3/2011 | Kawamura et al. ............ 714/20 |

FOREIGN PATENT DOCUMENTS

| EP | 0423421 A2 | 5/1990 |
| JP | 10075249 | 3/1998 |

* cited by examiner

*Primary Examiner* — Sarai Butler
(74) *Attorney, Agent, or Firm* — Cantor Colburn LLP; William A. Kinnaman, Jr.

(57) ABSTRACT

A channel path error correction system includes a processor with one or more channels and a switch operatively coupled to the one or more channels of the processor. The system also includes an I/O device including one or more ports, the I/O device being operatively coupled to the switch by the one or more ports; a plurality of control units. Each control unit includes at least one of the channels and at least one of the ports and a memory operable for storing information relating to detected channel path errors associated with each of the plurality of control units.

5 Claims, 11 Drawing Sheets

FIG. 1

| Control Unit Number | Channel Path 1 | Channel Path 2 | Comments |
|---|---|---|---|
| 1000 | Channel 1, Control unit port 1 | Channel 5, Control unit port 5 | |
| 2000 | Channel 1, Control unit port 1 | Channel 5, Control unit port 5 | Same channel and ports as 1000 |
| 3000 | Channel 1, Control unit port 2 | Channel 5, Control unit port 6 | Same channels as 1000 but different ports (but same host adapter cards) |
| 4000 | Channel 2, Control unit port 1 | Channel 6, Control unit port 5 | Same ports as 1000 but different channels (but same channel cards) |
| 5000 | Channel 1, Control unit port 3 | Channel 5, Control unit port 7 | Same channels as 1000 but different ports |

FIG. 2

| Channel Paths | Time Intervals | | | | | | | | | |
|---|---|---|---|---|---|---|---|---|---|---|
| 1 | 12:00:00<br>12:01:00<br>10 | 12:01:00<br>12:02:00<br>12 | 12:02:00<br>12:03:00<br>9 | 12:03:00<br>12:04:00<br>8 | 12:04:00<br>12:05:00<br>18 | 12:05:00<br>12:06:00<br>14 | 12:06:00<br>12:07:00<br>7 | 12:07:00<br>12:08:00<br>10 | 12:08:00<br>12:09:00<br>16 | 12:09:00<br>12:10:00<br>8 |
| 2 | 12:07:18<br>12:08:18<br>3 | 12:08:18<br>12:09:18<br>6 | 12:09:18<br>12:10:18<br>5 | 12:10:18<br>12:11:18<br>10 | 12:11:18<br>12:12:18<br>1 | 12:02:18<br>12:03:18<br>4 | 12:03:18<br>12:04:18<br>3 | 12:04:18<br>12:05:18<br>0 | 12:05:18<br>12:06:18<br>0 | 12:06:18<br>12:07:18<br>2 |
| . . . 8 | | | | | | | | | | |

Starting time - 12:02:18
Ending time - 12:03:18
Error count in time slot = 4

PROACTIVELY REMOVING CHANNEL PATHS IN ERROR FROM A VARIABLE SCOPE OF I/O DEVICES

BACKGROUND

The present disclosure relates to detecting and removing channel paths from use when errors are detected, and more specifically, to proactively removing channel paths from a variable scope of I/O devices.

Input/Output, or I/O devices, are generally connected to a processor via multiple channel paths. These I/O devices are designed such that they will remain functional as long as at least one channel path between the processor and the device is operational.

Typically, when an I/O operation is executed and an error is detected on a specific channel path, the operating system tests the channel path by issuing one or more recovery related I/O operations. During this process, applications wait to use the I/O device. If the recovery I/O operation is unsuccessful, the channel path is removed from the device, the application I/O is resumed and the original I/O operation is retried. This error recovery processing occurs on a device by device basis, so if the channel path error is associated with a hardware component that is shared by multiple devices (e.g., channel, channel card, switch, control unit port, control unit adapter card, fiber optic cables, etc.), each device using that hardware component will have to encounter the error before removing the defective channel path from the device.

The channel path error recovery process negatively affects application performance by delaying the application while the operating system performs recovery and then retrying the original I/O request. Furthermore, if an application uses multiple I/O devices that share the failing channel path, additional errors will be encountered as each device attempts to use the failing channel path causing further delays.

Additionally, certain types of channel path errors are intermittent in nature, that is, the application I/O may encounter an error but the recovery I/O used to test the channel path is successful and the channel path is therefore not removed from the device. Intermittent channel path errors negatively affect performance because applications may encounter errors multiple times. Typically when intermittent channel path errors occur, the channel path must be manually removed from the affected devices to stop errors from occurring.

SUMMARY

According to another embodiment of the present disclosure, a channel path error correction system includes a processor with one or more channels; a switch operatively coupled to the one or more channels of the processor: an I/O device including one or more poits, the I/O device being operatively coupled to the switch by the one or more ports; a plurality of control units, wherein each control unit includes at least one of the channels and at least one of the ports; and a memory operable for storing information relating to detected channel path errors associated with each of the plurality of control units.

According to a further embodiment of the present disclosure, a channel path error correction method includes: detecting one or more channel path errors on a channel path; identifying a defective channel path based on the one or more channel path errors, removing the defective channel path from one or more contol units for all devices which use those control units.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the disclosure provide improved resilience following various types of hardware problems by reducing the time required to recover from channel path errors. In exemplary embodiments, this may be accomplished by monitoring channel path errors and recognizing when the number of errors has exceeded a threshold and by recognizing the scope of the problem and removing the necessary channel paths from the affected device(s).

In an exemplary embodiment, determining the scope of the channel path error may be based on knowledge of the hardware topology, history of past errors, hardware components involved in the error and/or the likelihood of a failure of one component affecting a related component. In one embodiment, the scope of channel path error may be determined based on the set of devices that share the same channel and control unit port as the detecting device. In other exemplary embodiment, the scope of channel path error may be determined based on a larger scope, such as all devices that that use a common channel, control unit port, channel card and/or switch.

Figure 1:
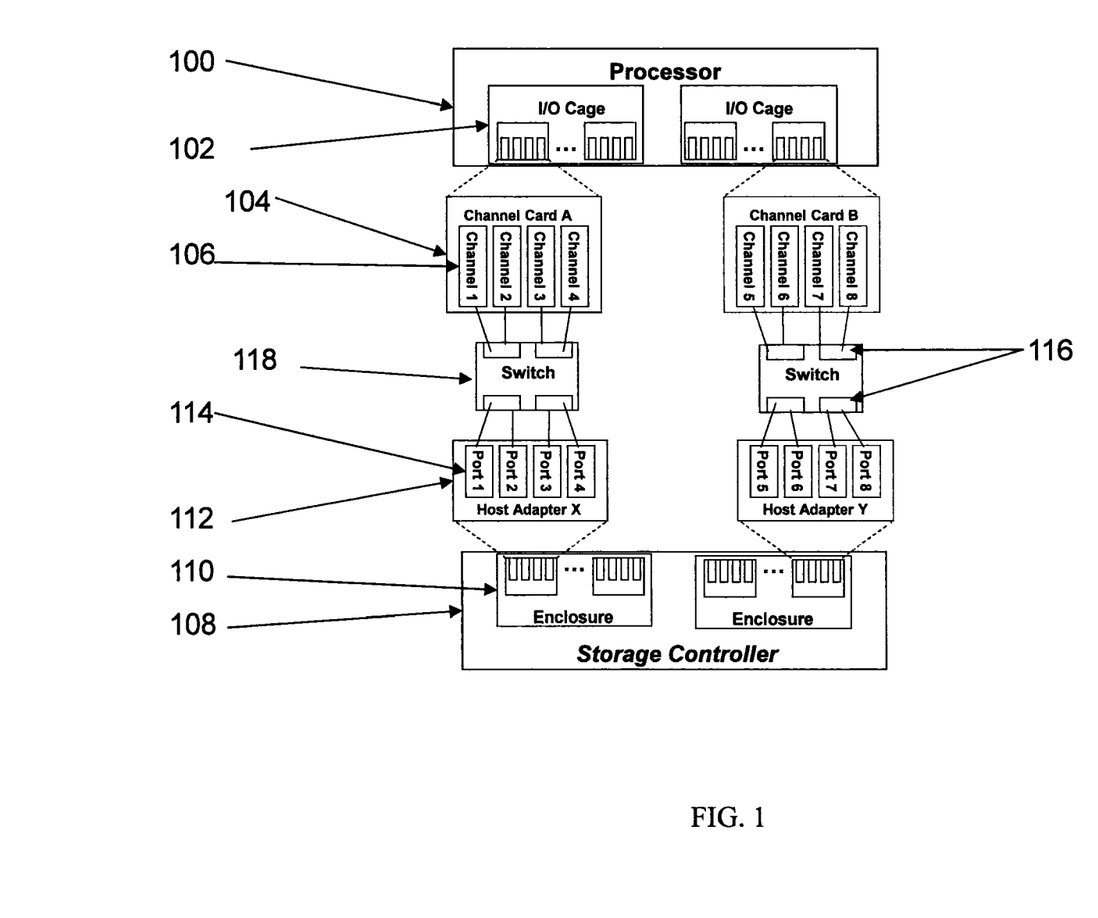
FIG. 1 is block diagram of an exemplary I/O hardware topology configuration in which an embodiment of the disclosure may be implemented.

Turning now to FIG. 1, a block diagram of an exemplary I/O hardware topology configuration in which an embodiment of the disclosure may be implemented. The exemplary hardware topology configuration includes a processor 100 that includes one or more I/O cages 102. The I/O cages 102 include one or more channel cards 104, and each channel card may contain up to four channels 106. The exemplary hardware topology configuration also includes a storage controller 108 that includes one or more enclosures 110. The enclosures 110 include one or more host adapter cards 112, where each host adapter card 112 includes up to four control unit ports 114. Each channel 106 and control unit port 114 are connected to a switch port on a switch 118. The switch 118 contains one or more port cards, where each port card 116 contains up to two switch ports. As shown in FIG. 1, all of the channels 106 on a channel card 104 and control unit ports 114 on a host adapter card 112 may be connected to the same switch 118. In other exemplary embodiments, the channels on the channel card and control unit ports on the host adapter card may be connected to various switches. The storage or I/O controller may control one or more I/O devices. The controller function may be implemented as a physical piece of hardware that is separate from the I/O devices or be integrated with the I/O devices. In an exemplary embodiment, the storage controller is divided into one or more logical controllers or control units that are responsible for a subset of the I/O devices for the storage controller, where each control unit is assigned a unique logical address. The assignment of channel paths to an I/O device (i.e., channels and CU ports) is done at a control unit level; therefore, all I/O devices assigned to a particular control unit have the same channel paths. Other control units within the storage controller may have the same or different channel paths. It will be appreciated by those of ordinary skill in the art that the storage controller 108 is provided as an exemplary I/O device and that any type of I/O device or I/O device controller may be used.

Figure 2:
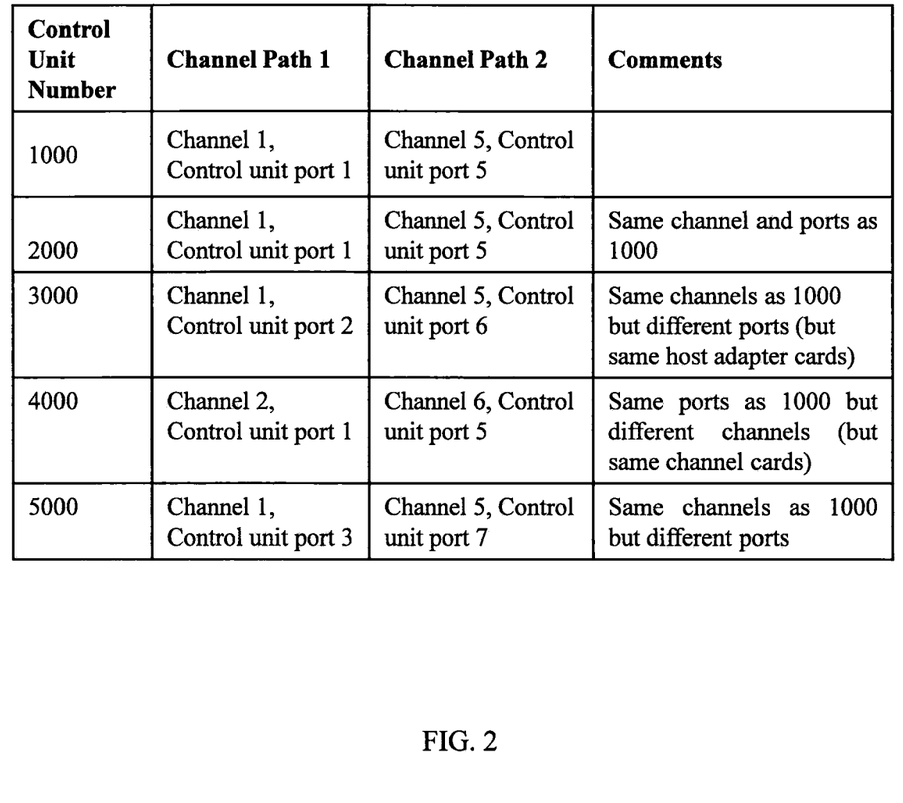
FIG. 2 is a table of channel path information for various control units in accordance with an exemplary embodiment.

Continuing now with reference to FIG. 2, a control unit table for an exemplary channel path error correction system is shown. In the exemplary system represented by the data in FIG. 2, each control unit is assigned two channel paths, where each channel path consists of a channel and a control unit port. When an I/O request is issued, the system selects a channel path, and the I/O request flows through the channel, the switch port connected to the channel, the switch port connected to the control unit port, and the designated control unit port on the storage controller.

In an exemplary embodiment, the channel path error correction system has no prior history of channel path errors and the system does not know the likelihood of a failure on one channel path signaling a problem at a higher level component such as a channel card. When a channel path error is detected for a device, the channel path that the error was detected on is removed from the device that encountered the error. In addition, the channel path will be removed for all devices which are defined for the control unit. For example, if an error occurs on the first channel path of control unit 1000, the channel path (i.e., channel 1, control unit port 1) is removed from all devices for control unit 1000.

In another exemplary embodiment, if more than one control unit uses the same channel and control unit port for a channel path then hardware problems will affect each of those control units. Therefore, if an error is encountered, the channel path can be removed from all control units that have the same channel and control unit port. For example, if the channel path error correction system decides to remove channel path 1 for all of the devices in control unit 1000, it can also remove channel path 1 from the devices in control unit 2000 as well, since both control units share the same hardware components for that channel path (i.e., channel 1, control unit port 1).

In another embodiment, a series of errors occurs on channel path 1 for control unit 1000 and the channel path is removed from control unit 1000. If this is the first control unit to encounter an error, the channel path error correction system can not determine if the problem is the channel, the control unit port, or some other hardware component. If the problem is the channel, then the channel path error correction system could remove the channel paths from all control units using the same channel, even if the control unit ports are different (i.e., control unit 3000), or remove the channel path from all control units using the same control unit ports, even if the channels are different (i.e., control unit 4000). However, in a channel path error correction system that is without any prior history of channel path errors, no additional changes are made to avoid inadvertently removing an operational channel path, since it is unable to determine which hardware component is causing the errors.

If a series of errors now occur on channel path 1 of control unit 3000 and the path is removed from control unit 3000, the channel path error correction system can then use past channel path error history to look for patterns. In both cases, the same channel (i.e., channel 1) is used for control units 1000 and 3000 but the control unit ports are different. So the channel path error correction system can assume that it more likely that the channel is the problem rather than two different control unit ports and remove the channel path from control unit 5000, which is using the same channel (i.e., channel 1).

In some cases prior history of channel path errors may not be enough to identify the probably source of the problem. In the previous example where the channel path was removed from control unit 5000, the channel path error correction system assumed that since the channel was the common component in the channel paths for two control units, that the channel was the problem. It was also assumed that since two different control unit ports were used in the channel paths, that the control unit ports were not the problem. However, in this case, the two control unit ports are on the same host adapter card, so it is possible that the host adapter card is the real source of the problem.

In exemplary embodiments, the problem associated with identifying the source of the channel path error can be addressed by being more conservative when removing channel paths from control units that did not encounter an error. In the above example, instead of proactively removing the path from control unit 5000 before any errors occur, the channel path error correction system may require a smaller number of errors, or an accelerated removal threshold, to occur on that channel path before removing the channel path. In another embodiment, the system may wait until any error involving the same channel that is connected to a control unit port on a different host adapter card is detected before removing channel paths that use the same channel. For example, if channel 1 for control unit 5000 was connected to control unit port 5, 6, 7, or 8, which is on a different host adapter card than control unit ports 1, 2, 3, and 4, then the system can conclude that channel 1 is the problem since the error occurs even when control unit ports on different host adapter cards are used.

Additionally, if the channel path error correction system has knowledge of the hardware, then it could also be used to determine the scope of the error. For example, if the channel path error correction system knows that an error on a control unit port is almost always caused a hardware component common to all control unit ports on the host adapter card, then the system can proactively remove all channel paths that use the affected host adapter card. In exemplary embodiments, this knowledge may be implicit or it may be obtained by the system via a device specific command when the device is initialized. In addition, the system may obtain information from all major components along the channel path. For example, information about the status of the channel hardware components could be obtained from the processor, and the status of switch hardware components could be obtained from the switch.

In exemplary embodiments, feedback information from the I/O device, such as the storage controller, can also be used to determine the scope of the channel path error. For example, if an I/O device is able to identify the failing hardware component, the scope of the channel path error can be surfaced in the device dependent sense data or can be obtained via a processor or device specific command. For example, when a unit check occurs because of a failing or failed hardware component, the sense data obtained for the unit check can contain information to identify the failing component. This information, combined with the information from the I/O device that enables mapping of hardware components to sets of control unit ports, can be used to identify which devices are affected and remove the proper channel path(s). Mapping of the hardware components to sets of control unit may be done as described in U.S. Pat. No. 6,745,347, the entirety of which is hereby incorporated by reference.

In exemplary embodiment where channel path errors are intermittent, the channel path error correction system monitors and records channel path errors and determines when the number of detected channel path errors exceeds a threshold. Once the system determines that a channel path has experienced a number of errors that exceeds the threshold, the system then determines the scope of the problem and removes the necessary channel paths from the affected device(s), as discussed in more detail above. To track intermittent channel path errors the system utilizes both a number of time periods or intervals and an error threshold. The number of time intervals specifies the overall length of time to monitor for errors (e.g., 10 one minute intervals). The error threshold specifies the minimum number of channel path related errors that must occur for each interval of time (e.g., each minute) before the channel path is removed from the affected device(s). For example, if the time interval is 10 one minute intervals and the error threshold is twenty, then at least twenty errors must occur each minute, for ten consecutive minutes, before the channel path is removed. For intermittent errors, channel path error data is collected and organized in a way that facilitates determining whether the channel path errors are occurring at a rate which affects performance.

Figure 3:
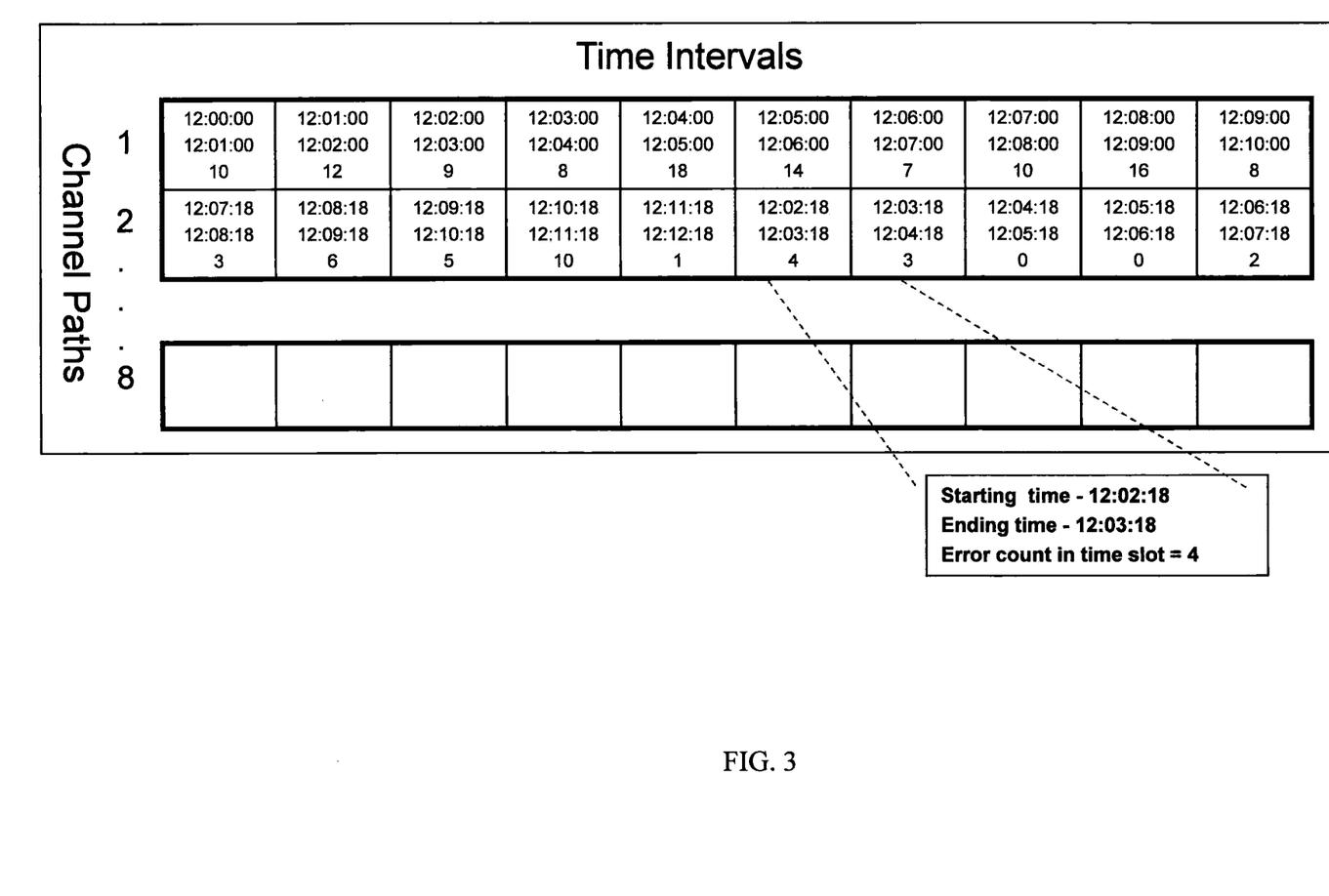
FIG. 3 is an illustration of a two dimensional array for storing channel path error data for multiple channel paths.

Referring now to FIG. 3, channel path error data for a particular control unit is stored as a two dimensional array, where the rows represent individual channel paths and the columns represent individual time intervals. In exemplary embodiments, the number of channel path errors is collected on a control unit basis, where a control unit includes multiple devices that share the same I/O topology (same channels and control unit ports and have the same logical address). The number of rows in the array is equal to the maximum number of channel paths defined for the control unit, and the number of columns in the array represents the number of time intervals (e.g., ten assuming one minute time intervals must be monitored before an action is taken). The error information for each channel path is independent from the others.

Figure 4:
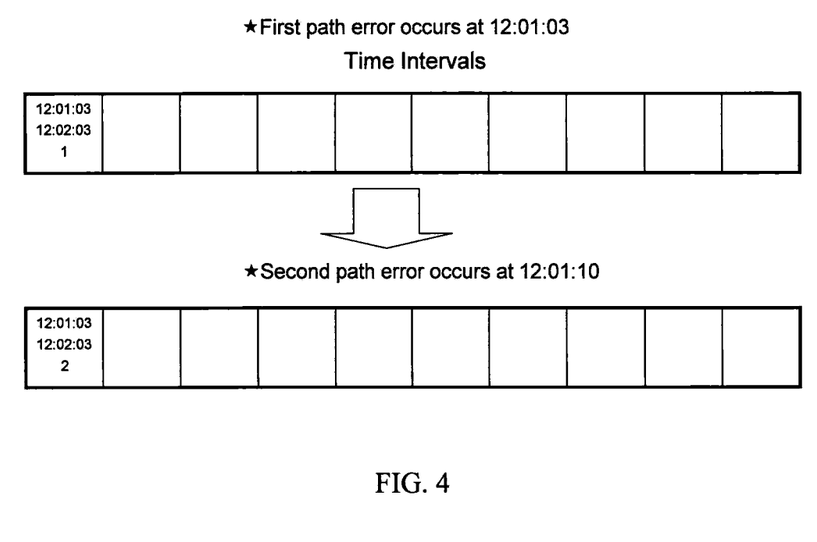
FIG. 4 is an illustration of an array for storing channel path error data for a channel path illustrating the detection of a first and second channel path error during a single time interval.

As illustrated in FIG. 4, when an error occurs for a channel path, if there are no time slots currently being used by the channel path, the first time slot's error count is set to a value of one. Additionally, if a channel path error falls within the time interval for the last used time slot, that time slot's error count is incremented by one.

Figure 5:
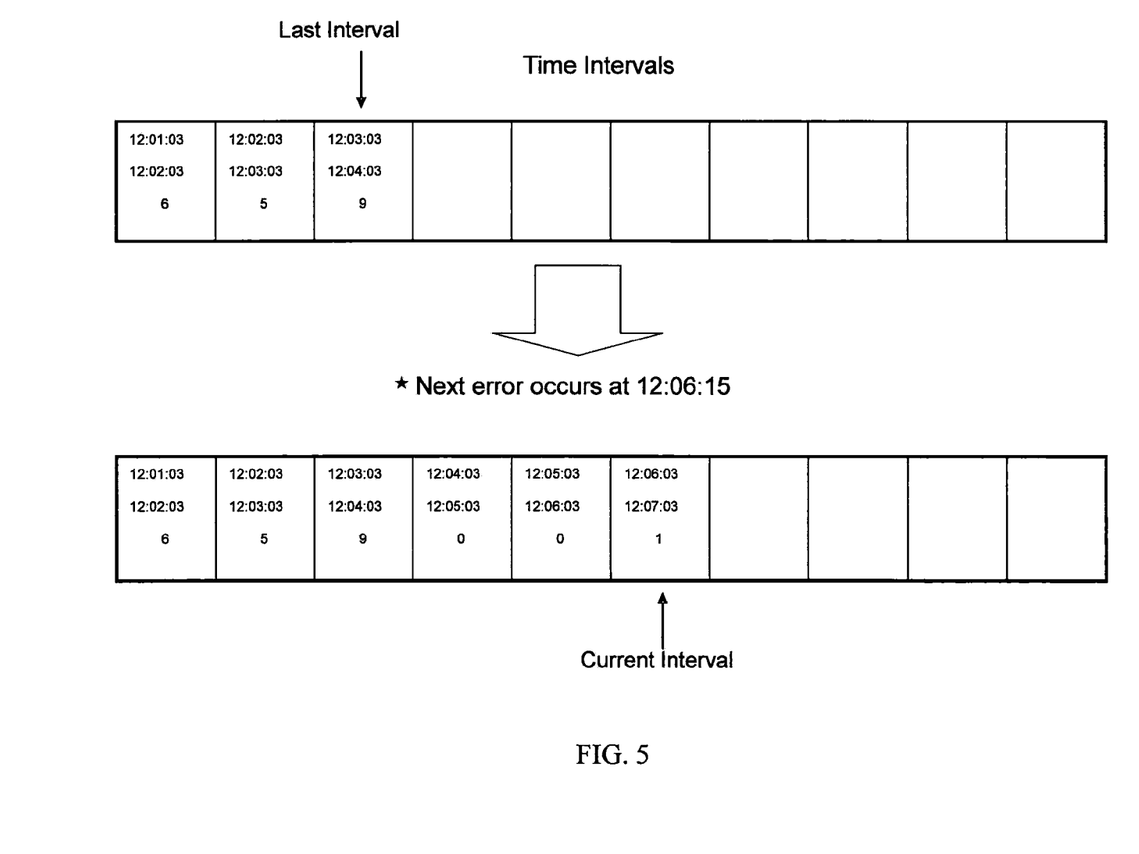
FIG. 5 is an illustration of an array for storing channel path error data for a channel path illustrating the detection of a channel path error during a time interval different from the last time interval, and where the current time interval is several time intervals from the last time interval.
Figure 6:
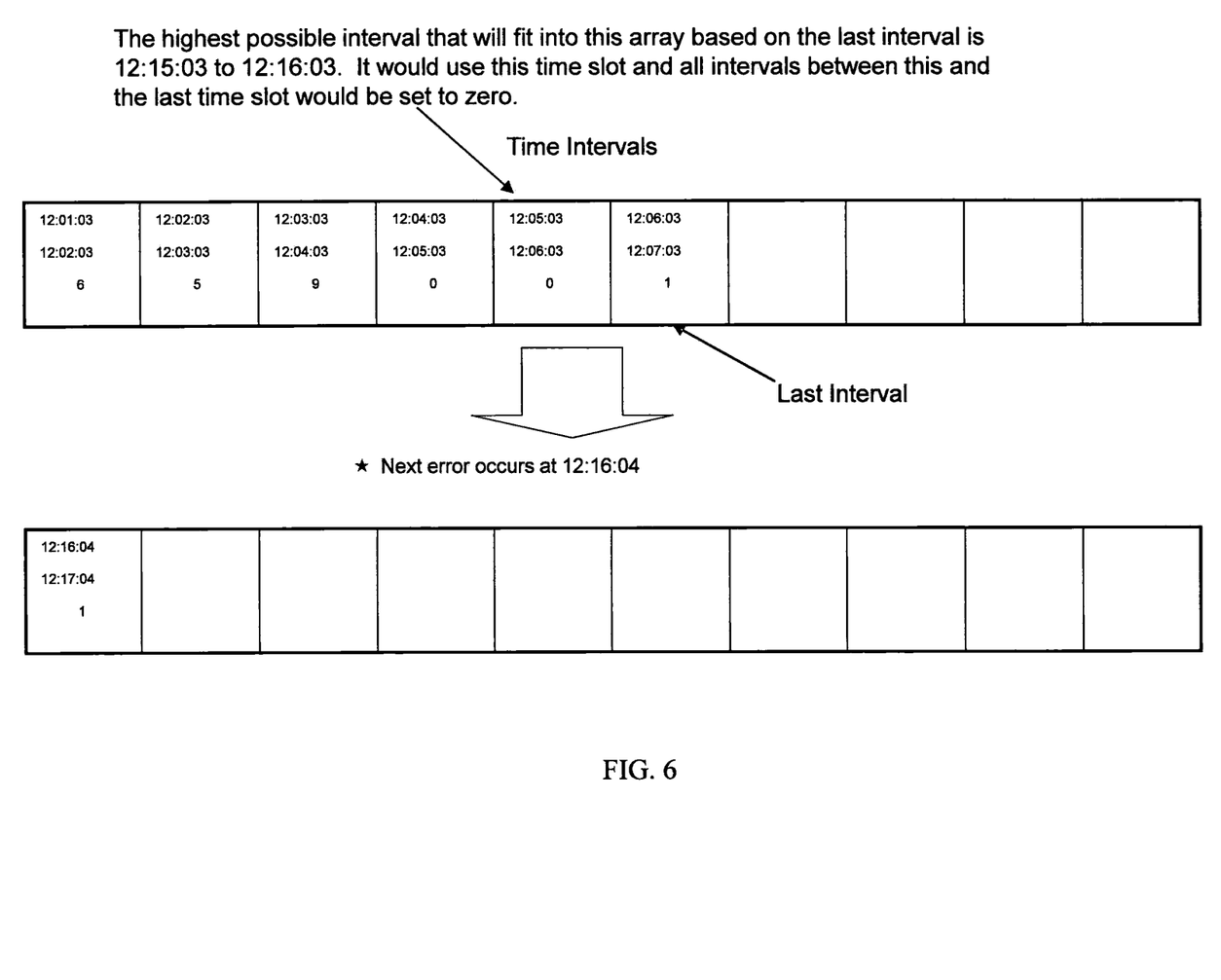
FIG. 6 is an illustration of an array for storing channel path error data for a channel path illustrating the detection of a channel path error during a time interval that is greater than the highest time interval that is possible based on the last time interval in which an error was observed.

As illustrated in FIG. 5, if the time of the channel path error is beyond the period of the time for the last used time slot for the channel path, the appropriate time slot for the time interval of the error is located, and the error count for any time slots between the last time slot used and the new time slot is set to zero. The new time slot then becomes the last used time slot and is updated with the correct error count. In exemplary embodiments, when the end of the array is reached the next time slot will revert back to the first slot of the array. As illustrated in FIG. 6, if the time of the channel path error is beyond the highest time interval that is possible based on the last interval for the channel path, the array for the channel path is cleared and the first time slot error count is set to one.

In exemplary embodiments, the system may determine whether the channel path needs to be removed from one or more devices when a channel path error occurs by comparing the total number of errors during the each time interval for the affected channel path meets or exceeds the error threshold value. If the error threshold is met or exceeded, the system will remove the channel path from the affected device(s).

In another exemplary embodiment, the system may determine whether the channel path needs to be removed from one or more devices by averaging the number of errors across the time intervals and comparing that average against an error threshold value. Additionally, the system may require that a minimum number of time intervals have non-zero error counts. In one example, the number of time intervals being monitored is set to 10 one minute intervals, the error threshold value is set to five and at least three time intervals must have non-zero error counts. If twenty path errors occur in time intervals 1, 5, and 7, and no errors occur in the other time intervals, then the error threshold has been met. In another example, the number of time intervals being monitored is set 10 one minute intervals, the error threshold value is set to five, and there are no restrictions on the number of time intervals required to have non-zero error counts. If thirty path errors occur in time interval 1, twenty path errors occur in time interval 8 and no errors occur in the other time intervals, or fifty path errors occur in interval 1 and no errors occur in the other time intervals, then the error threshold has been met.

In another exemplary embodiment, the system may be designed to periodically test channel paths that have been removed from one or more devices to determine if the channel paths should be restored. The system may use a test interval and an error threshold in determining if a channel path should be restored. The test interval can be either a fixed or variable time period at which the system tests a previously removed channel path. For example, once a channel path is removed the system could test the channel path after five minutes to determine if it is still experiencing errors. If the channel path is still experiencing errors in excess of the error threshold, the system will not restore the channel path and can set a new test interval. This new time interval could be the same amount of time, or the time interval could be increased either linearly or exponentially.

In other exemplary embodiments, the system may receive notifications from the processor, switch, or device that a defective hardware component has been repaired and the channel path should be restored. In this case, the system may restore the channel path or test the channel path for errors before restoring the channel path.

Figure 7:
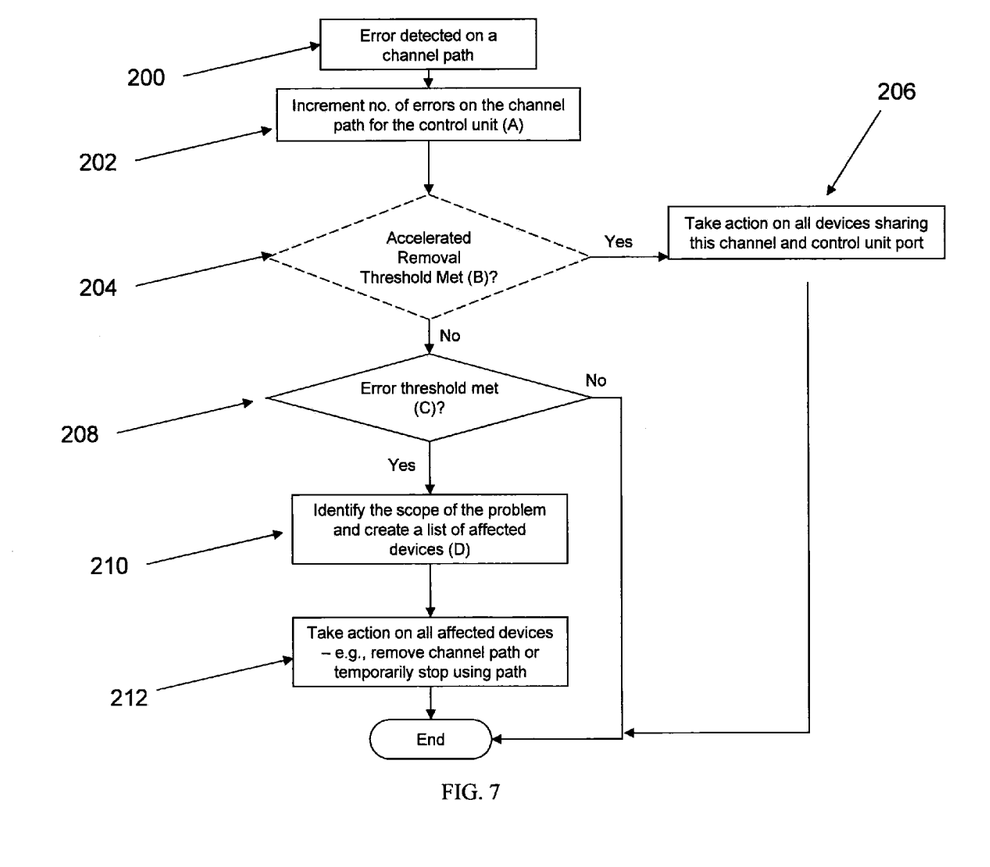
FIG. 7 is a flow diagram illustrating a channel path error correction method in accordance with an exemplary embodiment.

Turning now to FIG. 7, a flow diagram illustrating a channel path error correction method in accordance with an exemplary embodiment is shown. As shown at block 200, the first step in the channel path error correction method is to detect an error on a channel path. Next, at block 202, the channel path error correction method increments an error counter for the appropriate channel path, an exemplary method of which is depicted in more detail in FIG. 8 (discussed in further detail hereinafter).

Once the error counter has been incremented, the channel path error correction method may determine if an accelerated removal threshold has been met, as shown at decision block 204. An exemplary method for determining if an accelerated removal threshold has been met is illustrated in more detail in FIG. 9 (discussed in further detail hereinafter). If the accelerated removal threshold has been met, the channel path error correction system will take action on all devices sharing the channel and control unit port, as shown at block 206. If the accelerated removal threshold has not been met, or if the channel path error correction system does not include an accelerated removal threshold, the method then determines if the error threshold has been met, as shown at decision block 208. An exemplary method for determining if an error threshold has been met is illustrated in more detail in FIG. 10 (discussed in further detail hereinafter). If the error threshold has been met, then the method proceeds to block 210 and identifies the scope of the detected problem and creates a list of affected devices. An exemplary method for identifying a scope of a detected problem and creating a list of affected devices is illustrated in more detail in FIG. 11 (discussed in further detail hereinafter). As shown at block 212, once the affected devices have been identified the channel path error correction method takes action on the affected devices. If the error threshold has not been met, the method concludes without removing the channel path.

Figure 8:
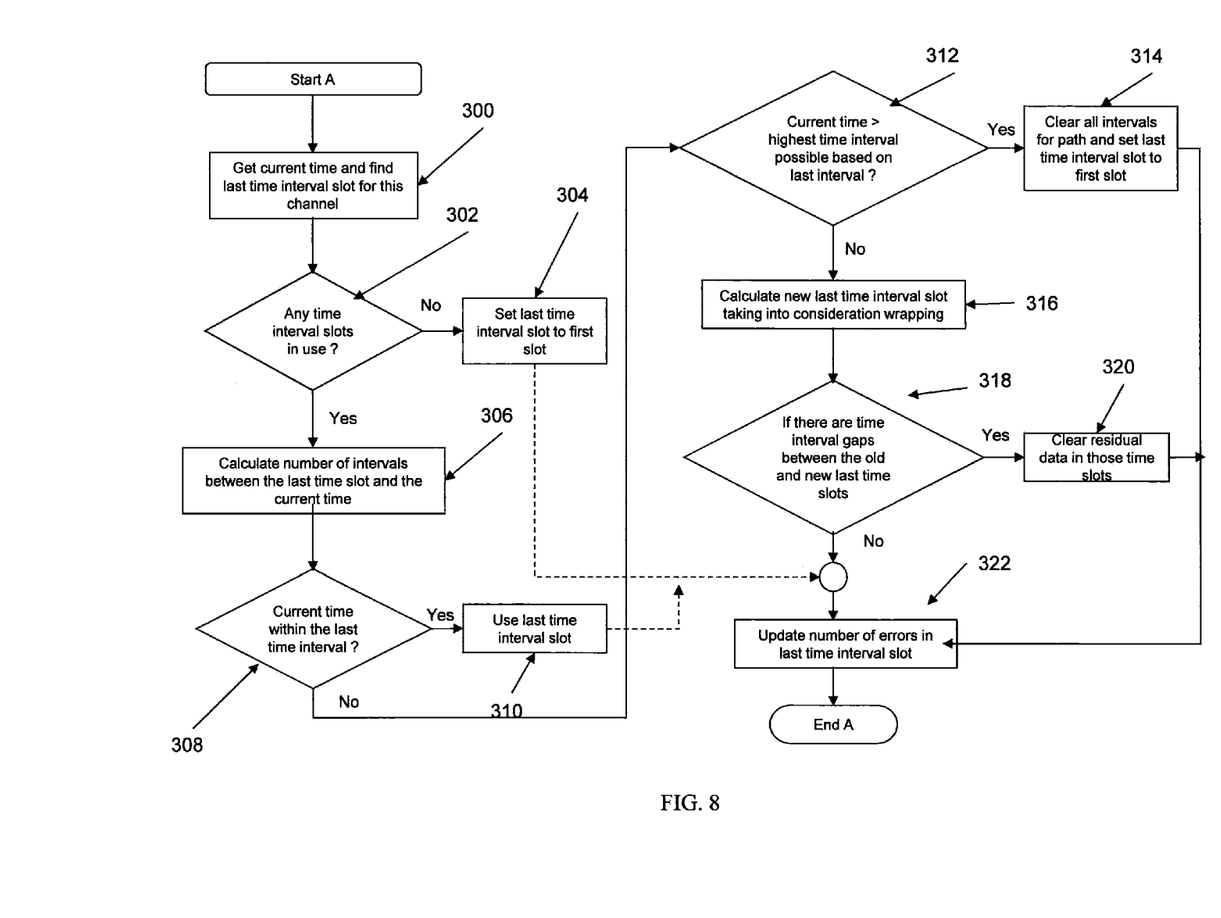
FIG. 8 is a flow diagram illustrating a method for incrementing an error counter in accordance with an exemplary embodiment.

Referring now to FIG. 8, a flow diagram illustrating a method for incrementing an error counter in accordance with an exemplary embodiment is shown. As shown, the method keeps track of the number of time intervals in use for a channel path and a number of errors during each time interval. When the maximum number of time intervals has been added to the array for a channel path, the method wraps around and starts over at the first time interval. In another embodiment, instead of wrapping and starting over at the first time interval, the method can shift all of the time slots by the required number of intervals.

As shown at block 300, the first step in the method for incrementing an error counter is to get the current time and find the last time interval slot for this channel path. At decision block 302, the method determines if there are any time intervals slots currently in use. If there are no time interval slots in use, the last time interval is set to the first slot, as shown at block 304. If there are slots in use, the number of intervals between the last time slot and the current time slot is calculated, as shown at block 306. At decision block 308, the method checks if the current time is within the last time interval. If the current time is within the last time interval, the last time interval slot is used, as shown at block 310. Otherwise, as shown at decision block 312, the method determines if the current time is greater than the highest time interval possible based on the last time interval. If the current time is greater than the highest time interval possible based on the last time interval, all intervals for the channel path are cleared and the last time interval is set to the first slot, as shown at block 314. Otherwise, the new time interval slot is calculated, as shown at block 316. At decision block 318, the method determines if there are time interval gaps between the old and new last time slots. If there are time interval gaps between the old and new last time slots the data in those time slots are cleared, as shown at block 320. The method concludes by updating the number of errors in the last time interval slot, as shown at block 322.

Figure 9:
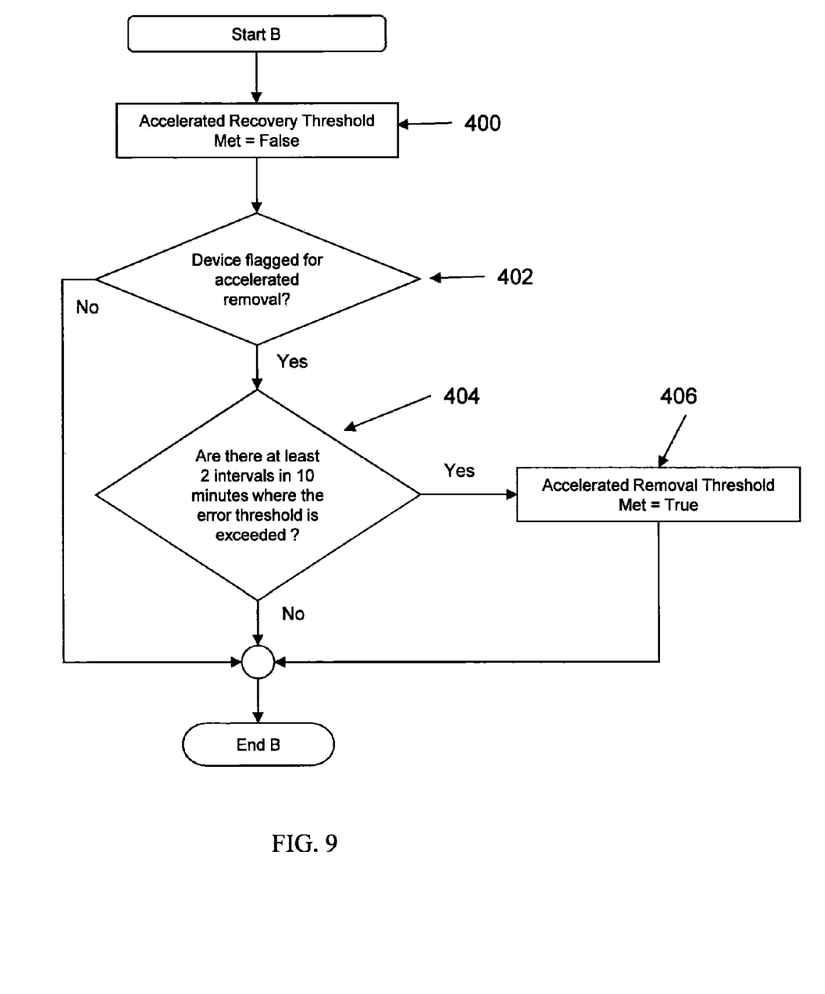
FIG. 9 is a flow diagram illustrating a method for determining if an accelerated removal threshold has been met in accordance with an exemplary embodiment.

Referring now to FIG. 9, a flow diagram illustrating a method for determining if an accelerated removal threshold has been met in accordance with an exemplary embodiment is shown. The accelerated removal process includes an accelerated removal threshold, which is a reduced number of channel path errors that will trigger the removal of a channel path. The accelerated removal process may be used when the channel path error correction system determines that an error has occurred for devices sharing the same channel but different control unit ports or an error has occurred for devices sharing the same control unit ports but different channels. When an error condition is detected, the channel path error correction system can either take action immediately for all devices sharing the channel or control unit port (that have not already been affected) or flag the devices for accelerated removal. By flagging the device for accelerated removal, the system will take action when a smaller number of errors occur or after a shorter interval instead of waiting for the required number of errors to occur over the specified number of intervals.

The first step in the method for determining if an accelerated removal threshold has been met is to set the accelerated error threshold value to false, as shown at block 400. The next in the method for determining if an accelerated removal threshold has been met, as shown at decision block 402, is to determine if the device has been flagged for accelerated removal. If the device has been flagged for removal, the method next determines if there are at least two intervals in the past ten minutes where the error threshold has been exceeded, as shown at decision block 404. If there are at least two intervals in the past ten minutes where the error threshold has been exceeded, then a result of "true" is returned to indicate that the accelerated error threshold has been met, as shown at block 406.

Figure 10:
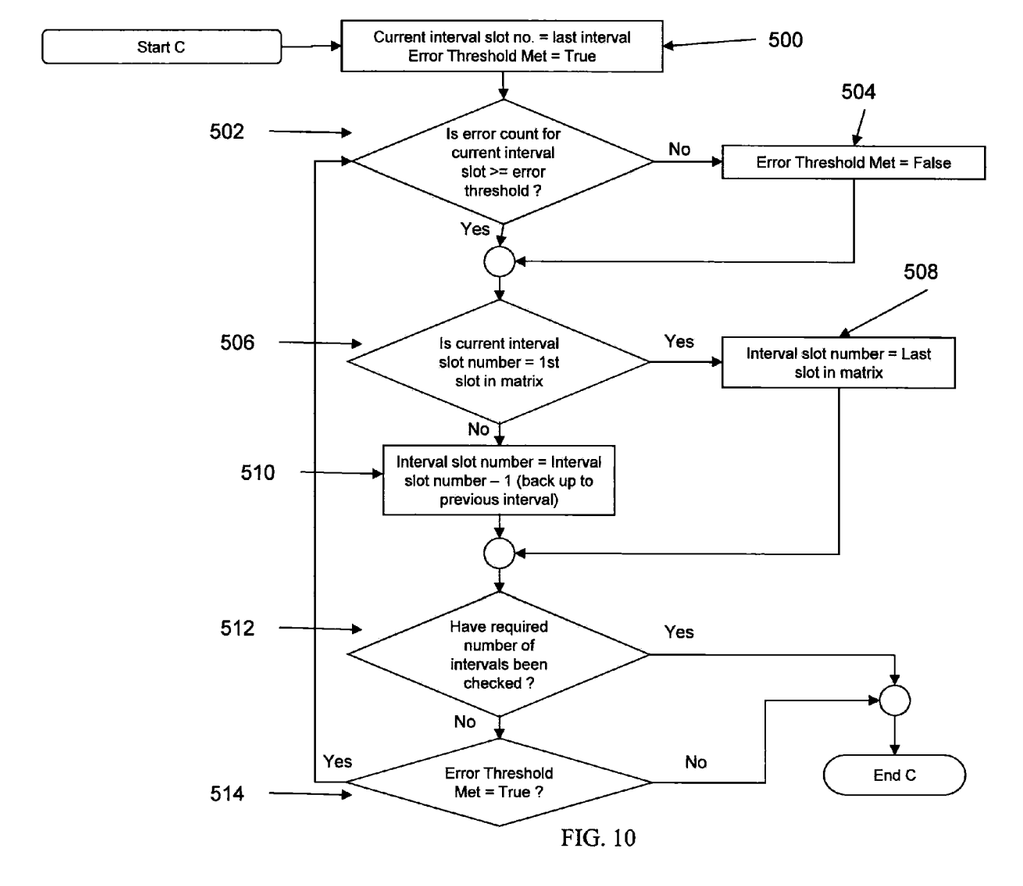
FIG. 10 is a flow diagram illustrating a method for determining if an error threshold has been met in accordance with an exemplary embodiment.

Referring now to FIG. 10, a flow diagram illustrating a method for determining if an error threshold has been met in accordance with an exemplary embodiment is shown. As discussed in more detail above, various methods for determining if an error threshold has been met can be used by the channel path error correction system. For example, an average the number of errors over a number of intervals can be used to determine if it is over an average error threshold. Alternatively, the method can require that a minimum number of time intervals with a non-zero error count. For example, if the number of intervals is 10, the threshold is 20 errors and the minimum number of intervals that must have non-zero error counts is two, then 200 errors in a single interval over a 10 minute period would not trigger an action to be taken, but 200 errors over 2 intervals in 10 minutes would.

The first step in the method for determining if determining if an error threshold has been met is to set the current interval slot number to the last time interval and to set the error threshold met variable to true, as shown at block 500. The next step in the method for determining if determining if an error threshold has been met, as shown at decision block 502, is to determine if the error count for the current interval slot is greater than or equal to the error threshold. If the error count for the current interval slot is less than the error threshold, the error threshold met variable is set to false, as shown at block 504. Otherwise, the method next determines if the current interval slot number the first slot in the array, as shown at decision block 506. If the current interval slot number is the first slot in the array, the interval slot number is set to the last slot, as shown at block 508. Otherwise the method decrements the interval slot number by one, as shown at block 510. At decision block 512, the method determines if the required number of intervals have been checked. If the required number of intervals have not been checked, the method determines if the error threshold variable is set to true, as shown at decision block 514.

Figure 11:
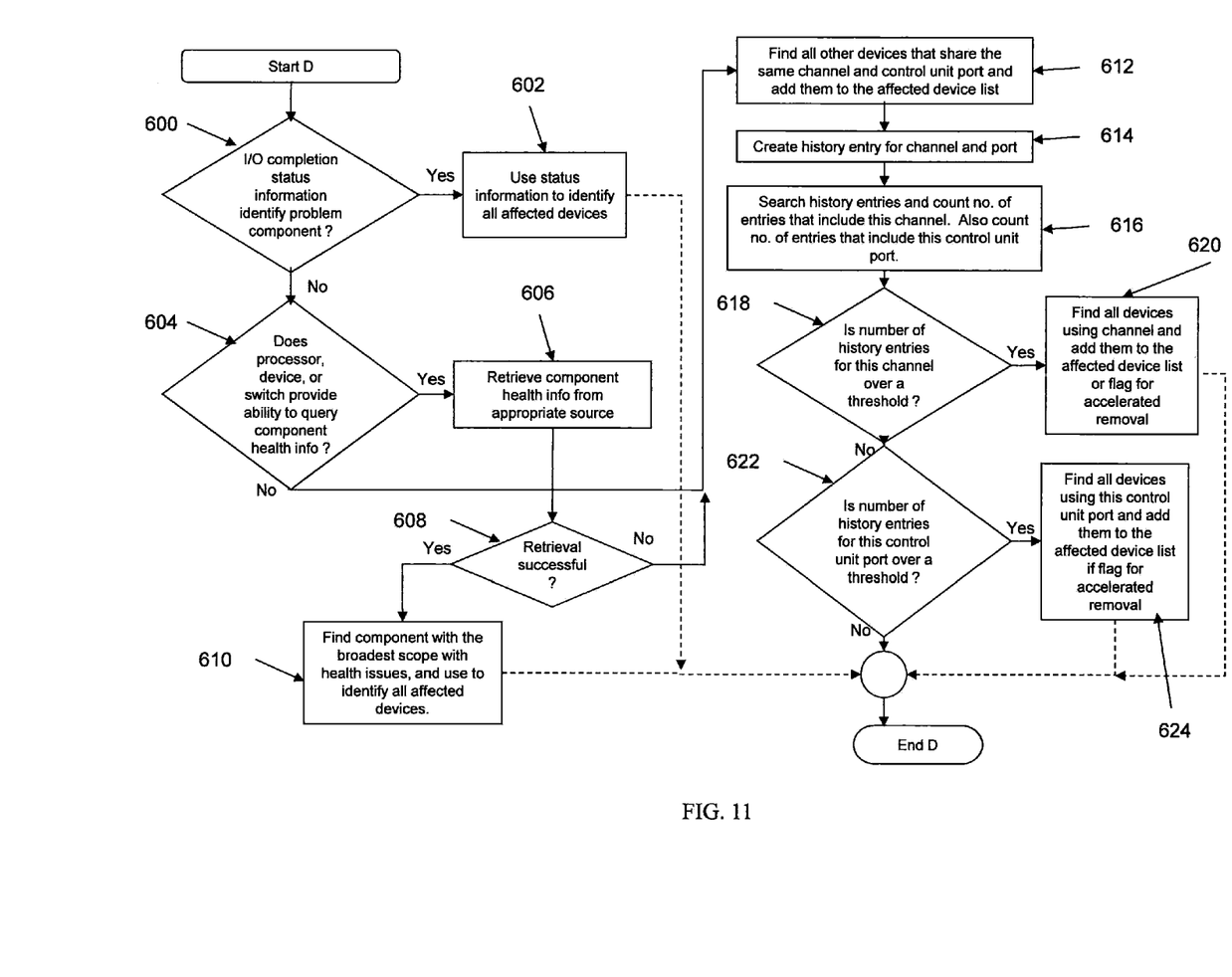
FIG. 11 is a flow diagram illustrating a method for identifying a scope of a detected problem and creating a list of affected devices in accordance with an exemplary embodiment.

Referring now to FIG. 11, a flow diagram illustrating a method for identifying a scope of a detected problem and creating a list of affected devices in accordance with an exemplary embodiment is shown. As illustrated, the method includes using any available status information from the I/O device or any hardware in the channel path. In addition the method includes looking for patterns in channel path error history. For example, if two devices share the same channel but have different control unit ports and an error occurs for both of those devices, then it is more likely that the problem is the channel instead of the problem being two different control unit ports.

As shown at decision block 600, the first step in the method for identifying a scope of a detected problem and creating a list of affected devices is to determine if the I/O completion status information identifies a problem component. If the I/O completion status information identifies a problem component, status information is used to identify all affected devices, as shown at block 602. Otherwise, the method determines if the hardware component provides the ability to query the health of the component, as shown at decision block 604. If the hardware component provides the ability to query the health of the component, the health information is retrieved at block 606. At decision block 608, the method determines if the health information for the hardware component was successfully retrieved. If so, as shown at block 610, the component with the broadest scope with health issues is found and used to identify all affected devices. For example, the hardware component may return a list of subcomponents that are having problems. The subcomponents can be ordered in a manner to identify which subcomponent affects the largest amount of devices. For example, assume that a storage controller contains multiple I/O enclosures, and each enclosure contains multiple host adapter cards, and each host adapter card contains multiple control unit ports. If both the enclosure and host adapter card are having problems, then the output for a particular channel path would indicate that the host adapter card and enclosure are having problems. However, the enclosure number would be used for identifying the all of the affected devices because it has the broadest scope.

Otherwise, as shown at block 612, all other devices that share the same channel and control unit port are found and added to the affected device list. Next, a history entry is created for the affected channel and port, as shown at block 614. Then the history entries are searched and the number of entries that share a common channel or port are counted, as shown at block 616. At decision block 618, the method determines if the number of history entries for the channel exceeds a threshold. If so, all devices using that channel are found and added to the affected device list or flagged for accelerated removal, as shown at block 620. Otherwise, at decision block 622, the method determines if the number of history entries for the control unit port exceeds a threshold. If so, all devices using that control unit port are found and added to the affected device list or flagged for accelerated removal, as shown at block 624.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A system comprising:
a processor comprising a plurality of channel cards, each having one or more channels;
a switch operatively coupled to the one or more channels;
one or more I/O devices comprising one or more ports, the one or more I/O devices being operatively coupled to the switch by the one or more ports;
a plurality of control units, wherein each control unit controls communication between the processor and at least one of the one or more I/O devices and comprises at least one of the one or more channels and at least one of the one or more ports; and
a memory, disposed on the processor, operable for storing information relating to detected channel path errors associated with each of the plurality of control units, wherein the memory comprises a two dimensional array associated with each of the plurality of control units, wherein the two dimensional array comprises one or more rows that correspond to channel paths and one or more columns that correspond to time periods, and
wherein each element of the two dimensional array includes a counter configured to store a number of errors that occurred on the channel path associated with the element during the time period associated with the element.

2. The system of claim 1, wherein the memory stores a threshold value for a maximum number of allowable channel path errors.

3. The system of claim 1, wherein the memory is operable for storing data associated with each of the plurality control units.

4. The system of claim 2, wherein the threshold value for a maximum number of allowable channel path errors corresponds to a maximum number of allowable channel path errors during a single time period.

5. The system of claim 2, wherein the threshold value for a maximum number of allowable channel path errors corresponds to a maximum number of allowable channel path errors across a time interval comprising multiple time periods.

* * * * *